(12) United States Patent
Adachi et al.

(10) Patent No.: US 9,726,532 B2
(45) Date of Patent: Aug. 8, 2017

(54) FLOW METER DEVICE (71) Applicant: Panasonic Intellectual Property Management Co., Ltd., Osaka-shi, Osaka (JP)

(72) Inventors: Akihisa Adachi, Kyoto (JP); Yuji Fujii, Nara (JP); Yuji Nakabayashi, Nara (JP); Hirokazu Gotou, Shiga (JP); Yukio Sakaguchi, Nara (JP); Aoi Watanabe, Nara (JP); Yasuharu Kawano, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 377 days.

(21) Appl. No.: 14/410,946

(22) PCT Filed: Jun. 28, 2013

(86) PCT No.: PCT/JP2013/004053
§ 371 (c)(1),
(2) Date: Dec. 23, 2014

(87) PCT Pub. No.: WO2014/002508
PCT Pub. Date: Jan. 3, 2014

(65) Prior Publication Data
US 2015/0323365 A1    Nov. 12, 2015

(30) Foreign Application Priority Data

Jun. 29, 2012  (JP) ................. 2012-146334
Jul. 13, 2012  (JP) ................. 2012-157199
Jul. 13, 2012  (JP) ................. 2012-157200

(51) Int. Cl.
*G01F 1/00*     (2006.01)
*G01B 3/00*     (2006.01)
(Continued)

(52) U.S. Cl.
CPC .............. *G01F 15/005* (2013.01); *G01F 1/00* (2013.01); *G01F 5/00* (2013.01); *G01F 7/00* (2013.01); *G01F 15/07* (2013.01)

(58) Field of Classification Search
CPC . G01F 1/662; G01F 1/667; G01F 5/00; G01F 7/00; G01F 15/07; G01F 1/00; G01F 15/005
(Continued)

(56) References Cited

U.S. PATENT DOCUMENTS 6,065,351 A     5/2000  Nagaoka et al.
6,474,132 B1   11/2002  Hathaway et al.
(Continued)

FOREIGN PATENT DOCUMENTS

DE    34 42 632 A1    5/1986
DE    41 04 451 A1    8/1992
(Continued)

OTHER PUBLICATIONS

International Search Report in corresponding International Application No. PCT/JP2013/004053, dated Jul. 23, 2013, 1 page.
(Continued)

*Primary Examiner* — An Do
(74) *Attorney, Agent, or Firm* — Brinks Gilson & Lione (57) ABSTRACT

A flow meter device includes plural fluid passages which are provided between an inlet section into which a fluid flows and an outlet section from which the fluid flows out, and through which the fluid flows and flow value measuring units installed in the plural fluid passages, respectively. The flow value measuring units are configured to measure flow values of the fluid flowing through the fluid passages. The flow meter device further includes a control unit configured to determine whether or not to cause one or more of the flow value measuring units to stop a measuring operation of the
(Continued)

flow value based on the flow values measured by the flow value measuring units. The control unit is further configured to determine whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value.

17 Claims, 6 Drawing Sheets

(51) Int. Cl.
*G01F 1/66* (2006.01)
*G01F 15/00* (2006.01)
*G01F 7/00* (2006.01)
*G01F 5/00* (2006.01)
*G01F 15/07* (2006.01)

(58) Field of Classification Search
USPC ........ 702/33, 45, 46; 73/861, 861.27–861.29
See application file for complete search history.

(56) References Cited

U.S. PATENT DOCUMENTS

| | | | |
|---|---|---|---|
| 6,508,133 B1 * | 1/2003 | Adachi | G01F 1/662 310/334 |
| 6,722,207 B1 | 4/2004 | Feller | |
| 8,489,342 B2 * | 7/2013 | Dugger | G01F 1/667 702/45 |
| 9,453,748 B2 * | 9/2016 | Yasuda | G01F 1/662 |
| 9,500,508 B2 * | 11/2016 | Gotou | G01F 3/22 |
| 2009/0188303 A1 | 7/2009 | Ooishi | |

FOREIGN PATENT DOCUMENTS

| | | |
|---|---|---|
| JP | 11-287676 A | 10/1999 |
| JP | 2000-146662 A | 5/2000 |
| JP | 2005-83773 A | 3/2005 |

OTHER PUBLICATIONS

Extended European Search Report in corresponding European Application No. 13810564.8, dated Aug. 11, 2015, 6 pages.
Office Action and English language translation of Search Report in corresponding Chinese Application No. 201380034290.5, dated Dec. 26, 2016, 7 pages.

* cited by examiner

FLOW METER DEVICE

This application is a 371 application of PCT/JP2013/004053 having an international filing date of Jun. 28, 2013, which claims priority to JP2012-146334 filed Jun. 29, 2012, JP2012-157199 filed Jul. 13, 2012 and JP2012-157200 filed Jul. 13, 2012, the entire contents of which are incorporated herein by reference.

TECHNICAL FIELD

The present invention relates to a flow meter device which includes plural fluid passages and measures the flow value (flow rate value) of a fluid flowing through the fluid passages.

BACKGROUND ART

Conventionally, as such a flow meter device, it is known that plural fluid passages are provided with on-off valves, respectively (e.g., see Patent Literature 1).

Figure 6:
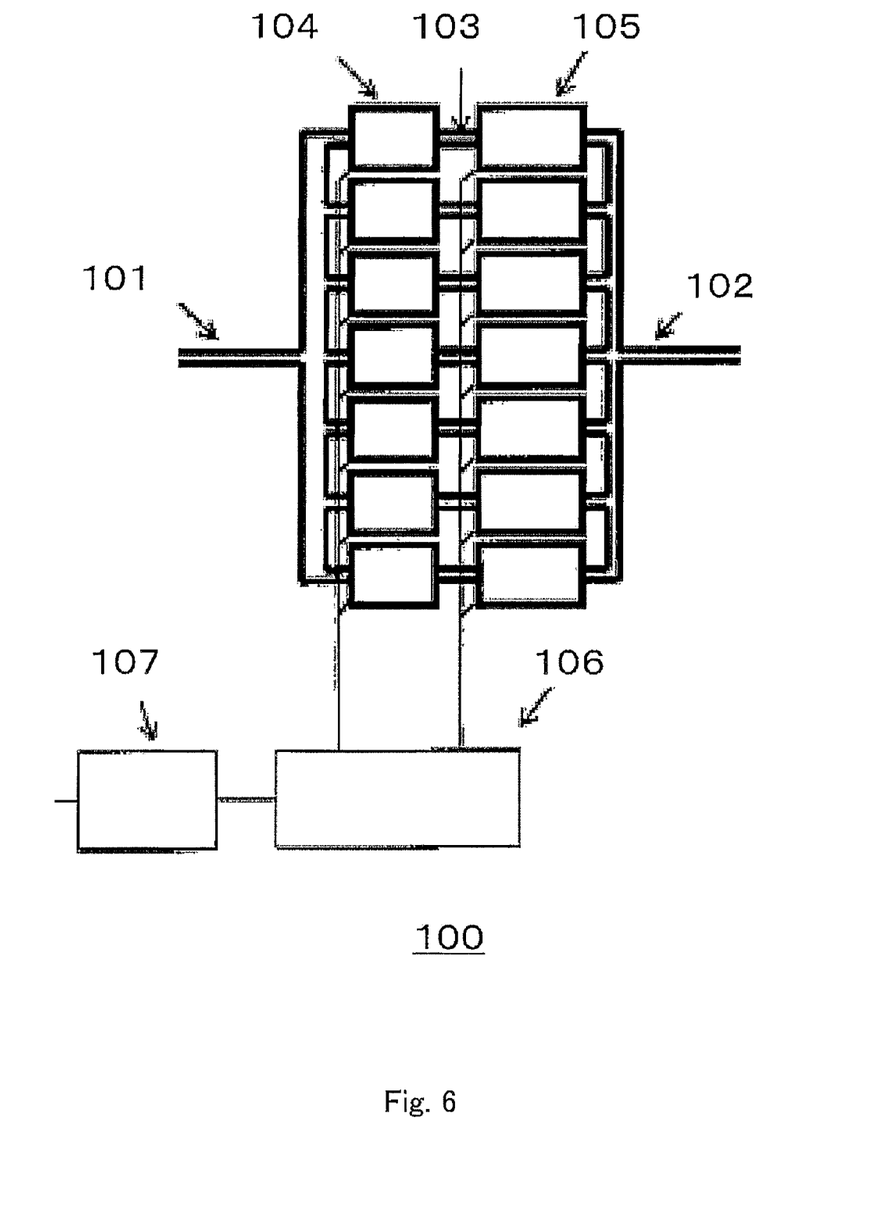
FIG. 6 is a block diagram showing the configuration of a conventional flow meter device.

FIG. 6 is a block diagram showing the configuration of a conventional flow meter device disclosed in Patent Literature 1.

As shown in FIG. 6, a flow meter device 100 disclosed in Patent Literature 1 is configured in such a manner that plural fluid passages 103 are provided between an inflow passage 101 and an outflow passage 102, and opening/closing units 104 and measuring units 105 are provided to correspond to these fluid passages 103, respectively.

In the flow meter device disclosed in Patent Literature 1, a control unit (power supply monitoring unit) controls electric power supplied from a power supply unit 107 to the opening/closing units 104. In this configuration, in the flow meter device 100 disclosed in Patent Literature 1, when the fluid passage through which the fluid flows is chosen according to the flow (flow rate) of the fluid flowing through the flow meter device 100, the control unit 106 is able to perform control such that the power supply unit 107 stops supplying electric power to the opening/closing unit 104 maintained in a closed state or in an open state. This can lessen a wasteful current.

CITATION LIST

Patent Literature

Patent Literature 1: Japanese Laid-Open Patent Application Publication No. Hei 11-287676

SUMMARY OF THE INVENTION

Technical Problem

However, in the above described conventional configuration, the flow meter device is unable to monitor a change in the flow value of the fluid flowing through the fluid passage provided with the measuring unit and to properly determine at which timing a measuring operation should be started or stopped, in order to implement flow value measurement with a high accuracy while saving electric power. In other words, the conventional configuration has a problem that it cannot be properly determined at which timing the measuring operation of the measuring unit should be started or stopped, while saving electric power.

The present invention has been made in view of the above described problem, and an object of the present invention is to provide a flow meter device which is capable of properly determining at which timing the measuring operation of the measuring unit should be started or stopped, while saving electric power.

Solution to Problem

To solve the above described problem, according to an aspect of the present invention, there is provided a flow meter device comprising: plural fluid passages which are provided between an inlet section into which a fluid flows and an outlet section from which the fluid flows out, and through which the fluid flows; flow value measuring units installed in the plural fluid passages, respectively, and configured to measure flow values of the fluid flowing through the fluid passages; and a control unit configured to determine whether or not to cause one or more of the flow value measuring units to stop a measuring operation of the flow value based on the flow values measured by the flow value measuring units, and whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value.

Advantageous Effects of Invention

The flow meter device of the present invention is configured as described above, and has an advantage that it can be properly determined at which timing the measuring operation of the flow value measuring unit should be started or stopped, while saving electric power.

DETAILED DESCRIPTION OF THE PREFERRED EMBODIMENTS

According to Embodiment 1 of the present invention, there is provided a flow meter device comprising: plural fluid passages which are provided between an inlet section into which a fluid flows and an outlet section from which the fluid flows out, and through which the fluid flows; flow value measuring units installed in the plural fluid passages, respectively, and configured to measure flow values of the fluid flowing through the fluid passages; and a control unit configured to determine whether or not to cause one or more of the flow value measuring units to stop a measuring operation of the flow value based on the flow values measured by the flow value measuring units, and whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value.

In accordance with this configuration, since the flow meter device includes the control unit, it can be determined whether or not to cause one or more of the flow value measuring units to stop the measuring operation based on the flow values measured by the flow value measuring units, and whether or not to cause the one or more of the flow value measuring units to resume the measuring operation, based on the flow value measured by the monitoring measuring unit. For example, in a case where it is detected that the flow value of the fluid is zero, or the like, and it is not necessary to measure the flow value, based on the flow values measured by the flow value measuring units, the flow value measuring units which are other than the monitoring measuring unit can be caused to stop the measuring operations. This can reduce electric power consumption. In addition, the flow value measuring units which are deactivated based on the flow value measured by the monitoring measuring unit, can resume the measuring operations, at an appropriate timing.

Therefore, the flow meter device of the present invention has an advantage that it can be properly determined at which timing the measuring operation of the flow value measuring unit should be started or stopped, while saving electric power.

According to a second aspect of the present invention, the flow meter device of the first aspect, may comprise a calculation unit configured to sum up the flow values measured by the flow value measuring units included in the plural fluid passages to derive a total flow value of the fluid flowing through the flow meter device; and the control unit may be configured to cause the flow value measuring units which are other than a specified flow value measuring unit as the monitoring measuring unit to stop the measuring operations of the flow values, when the total flow value of the fluid derived by the calculation unit is smaller than a first predetermined value.

According to a third aspect of the present invention, the flow meter device of the first aspect, may further comprise a calculation unit configured to sum up the flow values measured by the flow value measuring units included in the plural fluid passages to derive a total flow value of the fluid flowing through the flow meter device; and the control unit may be configured to cause the flow value measuring units which are other than specified two or more flow value measuring units as the monitoring measuring units to stop the measuring operations of the flow values, when the total flow value of the fluid derived by the calculation unit is smaller than a first predetermined value.

In accordance with this configuration, two or more flow value measuring units are chosen as the monitoring measuring units. Therefore, even when a failure occurs in one of the monitoring measuring units, a change in the flow value of the fluid flowing through the fluid passage can be detected by using the other monitoring measuring unit. In this way, the process for monitoring a change in the fluid flow value can be performed with a higher reliability.

According to a fourth aspect of the present invention, the flow meter device of the first aspect, may comprise a calculation unit configured to derive total flow values of the fluid flowing through the flow meter device, based on the flow values measured by the flow value measuring units included in at least two fluid passages of the plural fluid passages; and the control unit may be configured to cause the flow value measuring units which are other than a specified flow value measuring unit as the monitoring measuring unit to stop the measuring operations of the flow values, when the total flow value of the fluid derived by the calculation units is smaller than a first predetermined value.

In accordance with this configuration, since the calculation unit can derive the total flow values of the fluid flowing through the flow meter device, based on the flow values measured by the flow value measuring units, it is not always necessary to install the flow value measuring units in all of the plural fluid passages. In addition, even when there is a failure in any one of the flow value measuring units provided in the fluid passages, the total flow value of the fluid can be derived.

According to a fifth aspect of the present invention, in the flow meter device of any one of the second to fourth aspects, the first predetermined value may be deemed as a substantially zero flow value. The value deemed as the substantially zero flow value is defined as a value set to be deemed as the zero flow value, in view of a measurement error of the fluid flow which is attributed to non-uniformity of results of measurement in a measuring system such as the flow value measuring units.

According to a sixth aspect of the present invention, in the flow meter device of any one of the second to fourth aspects, the control unit may be configured to choose the flow value measuring unit corresponding to a smallest measurement flow value, as the monitoring measuring unit, from among the plural flow value measuring units.

In accordance with this configuration, the flow value measuring unit corresponding to the smallest measurement gas flow value may be chosen as the monitoring measuring unit. This is because in a case where the gas flow value in the measurement fluid passage corresponding to a small gas flow value can be detected, it may be determined that the gas is flowing through the other measurement fluid passages at flow values which are equal to or larger than the detected flow value. Therefore, after the state in which the fluid is flowing through each of all of the fluid passages at a specified flow value is formed, it is determined whether or not to restore the flow value measuring units of the deactivated measurement fluid passages to the state in which they resume the measuring operations. Thus, the flow meter device according to the sixth aspect of the present invention is capable of determining whether or not there is a change in the flow values in all of the fluid passages, with a higher reliability.

According to a seventh aspect of the present invention, in the flow meter device of any one of the second to fourth aspects, the control unit may be configured to choose the flow value measuring unit corresponding to a largest measurement flow value, as the monitoring measuring unit, from among the plural flow value measuring units.

In accordance with this configuration, the flow value measuring unit of the measurement fluid passage corresponding to the largest measurement gas flow value may be chosen as the monitoring measuring unit. The measurement fluid passage corresponding to the largest measurement gas flow value refers to a fluid passage having a largest cross-sectional area among the plural measurement fluid passages arranged in parallel. Since the fluid flows at a larger amount through the measurement fluid passage which has a larger cross-sectional area and thereby generates a smaller pressure loss, the flow meter device of the present invention can perform determination as to the measurement of the fluid flow value, earlier.

According to an eighth aspect of the present invention, in the flow meter device of any one of the second to fourth aspects, the control unit may be configured to change the flow value measuring unit chosen as the monitoring measuring unit from among the plural flow value measuring units, sequentially with a passage of time.

In accordance with this configuration, it becomes possible to change the flow value measuring unit which will become the monitoring measuring unit, sequentially with a passage of time. Therefore, even when there is a failure in any one of the flow value measuring units which will become the monitoring measuring units, the flow value measuring unit which will become the monitoring measuring unit can be sequentially changed, and thereby the flow value measuring unit in which there is no failure can perform the monitoring operation. This makes it possible to reliably monitor a change in the flow value of the gas flowing through the measurement fluid passage.

According to a ninth aspect of the present invention, in the flow meter device of any one of the second to fourth aspects, the control unit may be configured to fix a specified flow value measuring unit as the monitoring measuring unit, among the plural flow value measuring units. In this configuration, the control unit fixes the specified flow value measuring unit as the monitoring measuring unit. Therefore, it becomes possible to monitor a change in the flow value of the gas flowing through the monitoring measurement fluid passage provided with the monitoring measuring unit, under a constant measurement accuracy.

According to a tenth aspect of the present invention, in the flow meter device of the second or fourth aspect, the control unit may be configured to cause the flow value measuring units which are other than one monitoring measuring unit to resume the measuring operations, when the flow value measured by the monitoring measuring unit is equal to or larger than a second predetermined value, in a state in which only the one monitoring measuring unit is performing the measuring operation of the flow value of the fluid.

In this configuration, when the flow value measured by the monitoring measuring unit is equal to or larger than the second predetermined value, the flow value measuring units which are other than this monitoring measuring unit, i.e., the deactivated flow value measuring units can resume the measuring operations. The second predetermined value may be, for example, a flow value from which it can be determined that a device or the like started to use the fluid. When the flow value becomes equal to or larger than this flow value, it may be determined that the use of the fluid started and the fluid started to flow, and the deactivated flow value measuring units can resume the measuring operations promptly.

According to an eleventh aspect of the present invention, in the flow meter device of the third aspect, the control unit may be configured to cause the flow value measuring units which are other than at least two monitoring measuring units to resume the measuring operations, when the flow value measured by the monitoring measuring unit is equal to or larger than a second predetermined value, in a state in which the at least two monitoring measuring units are performing the measuring operations of the flow values of the fluid. In accordance with this configuration, since the two or more monitoring measuring units are provided, a change in the flow value of the fluid can be monitored with a higher reliability.

According to a twelfth aspect of the present invention, in the flow meter device of the tenth or eleventh aspect, the second predetermined value may be preferably larger than the first predetermined value.

Hereinafter, Embodiment 1 to Embodiment 3 of the present invention will be described with reference to the drawings. Note that the present invention is not limited by Embodiment 1 to Embodiment 3.

Embodiment 1

Embodiment 1 will be described with reference to FIGS. 1 and 2.

Figure 1:
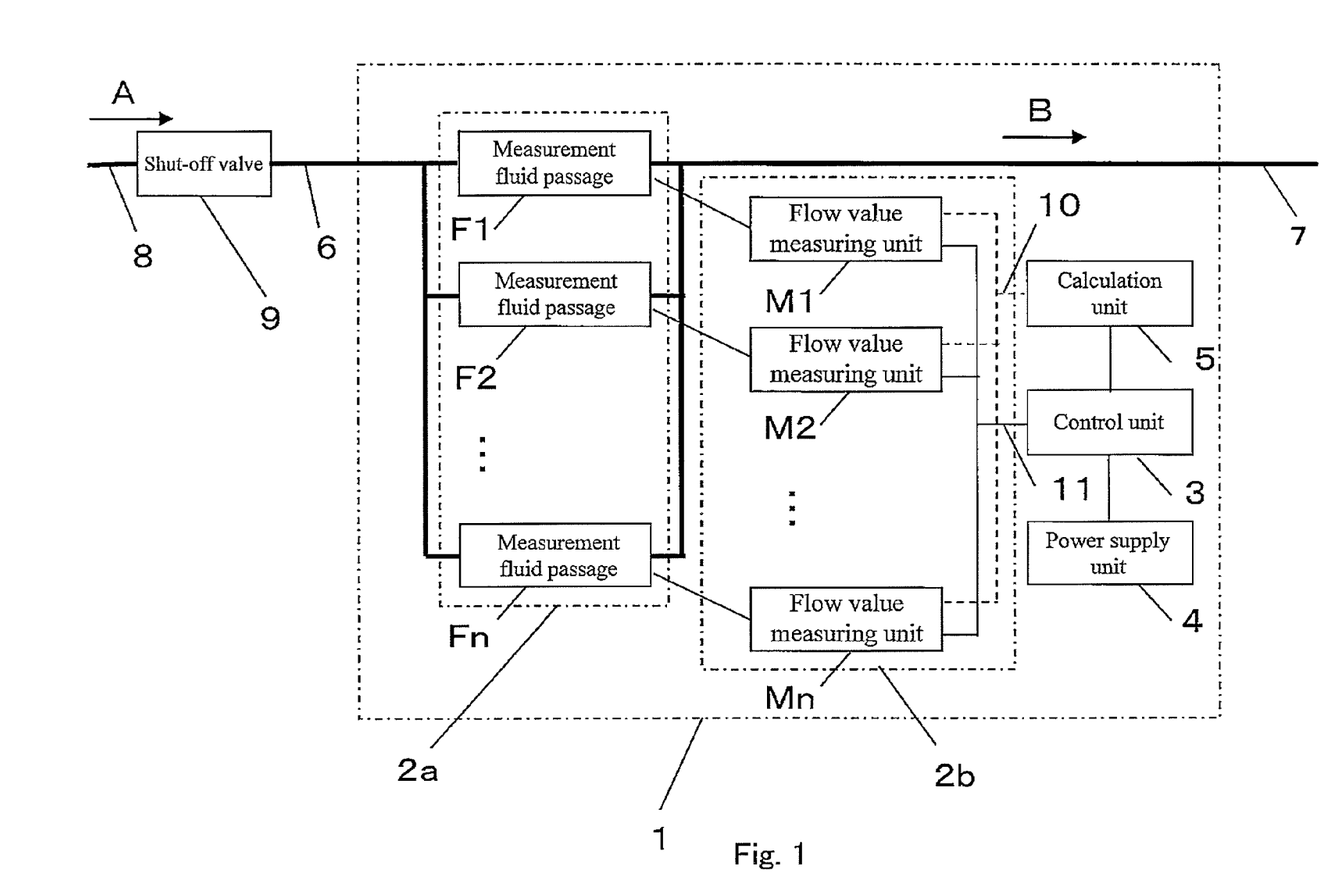
FIG. 1 is a block diagram showing the exemplary schematic configuration of a flow meter device according to Embodiment 1 of the present invention.

FIG. 1 is a block diagram showing the exemplary schematic configuration of a flow meter device 1 according to Embodiment 1 of the present invention. The flow meter device 1 of the present embodiment is installed in the intermediate portion of a pipe member (gas pipe) 8 and configured to obtain the flow (flow rate) of a gas flowing through the pipe member 8.

As shown in FIG. 1, the flow meter device 1 of Embodiment 1 includes a measurement fluid passage section 2a, a flow value measuring module 2b, a control unit 3, a power supply unit 4, and a calculation unit 5. The upstream side of the flow meter device 1 is connected to an inlet section 6, while the downstream side of the flow meter device 1 is connected to an outlet section 7. The flow meter device 1 is connected to the pipe member 8 via the inlet section 6 and the outlet section 7.

A shut-off valve 9 is provided between the inlet section 6 and the pipe member 8 at the upstream side, and connected to them. For example, in a case where an abnormality such as gas leakage at a location in a range from the flow meter device 1 to a gas apparatus (not shown) placed at a gas consumption side (downstream side) is detected, or there is a request for shut-off from outside, etc., the shut-off valve 9 closes the inlet section 6 to shut-off a gas flow.

In the flow meter device 1 according to Embodiment 1, as shown in FIG. 1, there are provided plural fluid passages arranged in parallel between the inlet section 6 and the outlet section 7. Hereinafter, these plural fluid passages will be referred to as measurement fluid passages F1 to Fn. The measurement fluid passages F1 to Fn are provided with flow value measuring units M1 to Mn for measuring the flow values of the gas flowing through the measurement fluid passages F1 to Fn, respectively. The measurement fluid passage section 2a branches at the inlet section 6 into at least the plural measurement fluid passages F1 to Fn arranged in parallel, which are then joined together and integrated into a single fluid passage in a location that is before the outlet section 7.

The measurement fluid passages F1 to Fn are attached with sensors (not shown) for measuring the flow values, respectively, and measure the flow values of the fluids flowing through the measurement fluid passages, by using these sensors. Any flow value measurement method may be employed, so long as it can implement instantaneous measurement, for example, an ultrasonic method, a flow sensor method, a fluidic method, etc.

The inlet section 6 may be connected to the measurement fluid passages F1 to Fn, by branch pipe joints, or a chamber forming a space may be provided between the inlet section 6 and the measurement fluid passages F1 to Fn to supply the gas to each of the measurement fluid passages F1 to Fn via the chamber. The same applies to the outlet section 7.

The flow value measuring units M1 to Mn for measuring the flow values of the measurement fluid passages F1 to Fn, respectively, are connected to the calculation unit 5 by a wire 10, and to the control unit 3 by a wire 11. As a matter of course, the flow value measuring units M1 to Mn may be wirelessly connected to the calculation unit 5 and to the control unit 3.

Next, an example of a stop process, a monitoring process, and a restoration (resuming) process in a flow value measuring process, of the flow meter device 1 according to Embodiment 1 will be described, with reference to FIG. 2. FIG. 2 is a flowchart showing the example of the stop process, the monitoring process, and the restoration (resuming) process in the flow value measuring process, of the flow meter device 1 according to Embodiment 1 of the present invention.

Figure 2:
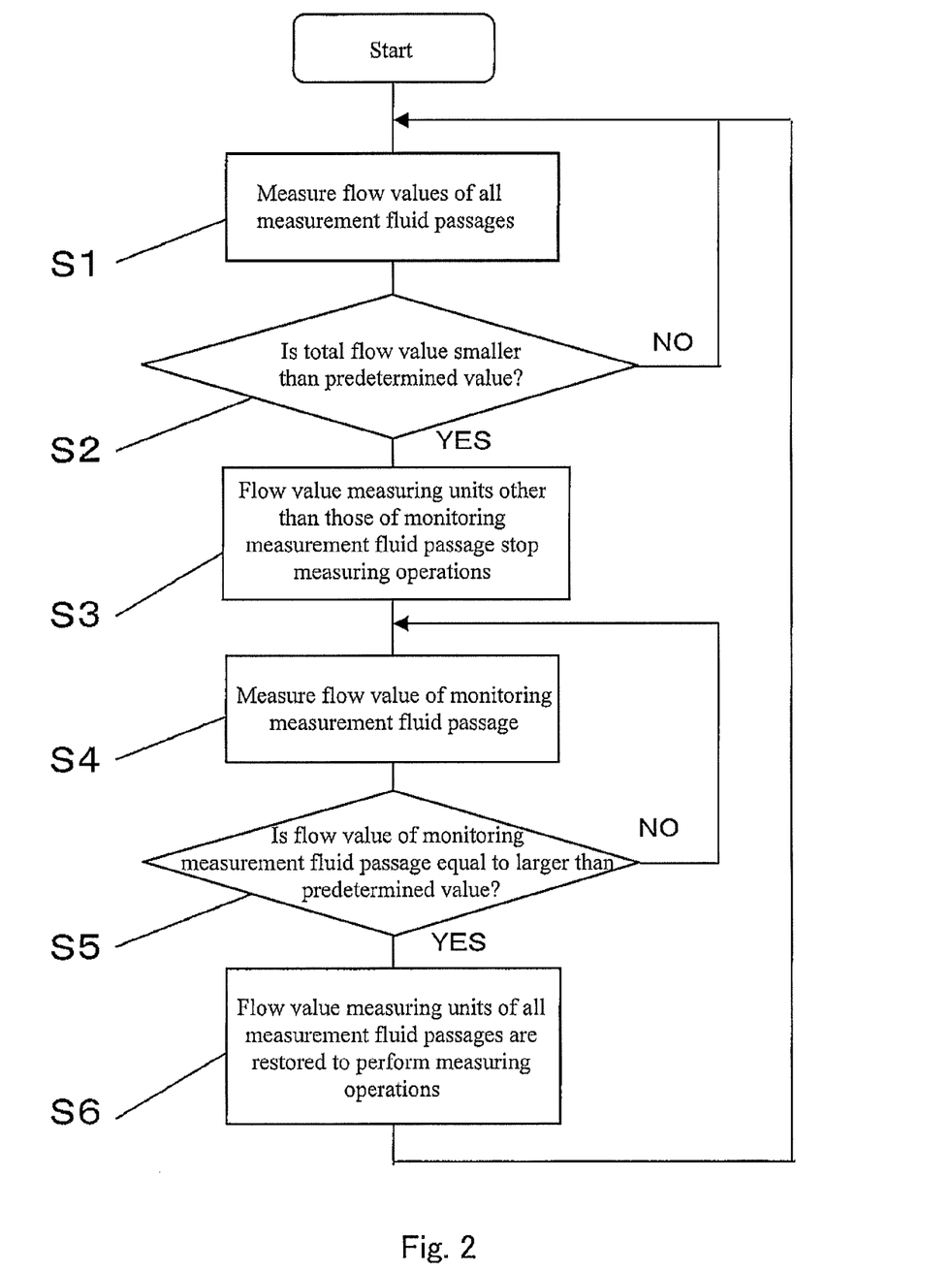
FIG. 2 is a flowchart showing an example of a stop process, a monitoring process, and a restoration (resuming) process in a flow value measuring process, of the flow meter device according to Embodiment 1 of the present invention.

With reference to the flowchart of FIG. 2, in step S1, the flow value measuring units M1 to Mn corresponding to all of the measurement fluid passages perform the flow value measuring process. Then, in step S2, it is determined whether or not a total flow value which is a sum of the flow values measured by the flow value measuring units M1 to Mn is smaller than a predetermined value Qs (first predetermined value). When it is determined that the total flow value is smaller than the predetermined value Qs in the determination of step S2 ("YES" in step S2), the process moves to step S3. Conversely, when it is determined that the total flow value is larger than the predetermined value Qs in step S2 ("NO" in step S2), the process returns to step S1, and the steps are repeated. In step S3, a measuring operation stop process is performed in such a manner that the flow value measuring units included in the measurement fluid passages which are other than the measurement fluid passage chosen as a monitoring measurement fluid passage are caused to stop the measuring operations. Then, in step S4, the flow value measuring unit included in the monitoring measurement fluid passage performs the flow value measuring process. Then, in step S5, it is determined whether or not the flow value of the monitoring measurement fluid passage which is measured in step S4 is equal to or larger than a predetermined value Qm (second predetermined value). When it is determined that the measured flow value of the monitoring measurement fluid passage is equal to or larger than the predetermined value Qm ("YES" in step S5), the process moves to step S6. In step S6, the measuring operation restoration process is performed in such a manner that the flow value measuring units of all of the deactivated measurement fluid passages, are restored to the state in which they resume the measuring operations. Conversely, when it is determined as "NO" in step S5, the process returns to step S4, and the flow value of the gas flowing through the monitoring measurement fluid passage is measured.

Hereinafter, the operation and advantages of the flow meter device 1 which is configured as described above and performs the process flow will be described more specifically.

Firstly, the overall measuring system will be described with reference to FIG. 1.

As shown in FIG. 1, as indicated by an arrow A, the gas flows through the pipe member 8, and the shut-off valve 9, and reaches the inlet section 6. Then, the gas flows into the measurement fluid passage section 2a of the flow meter device 1.

As described above, the measurement fluid passage section 2a branches at the inlet section 6 into the plural measurement fluid passages F1 to Fn. Therefore, the gas flowing through the pipe member 8 is divided into the gas corresponding to the measurement fluid passages F1 to Fn, respectively, and the gas flow into the measurement fluid passages F1 to Fn, respectively. The measurement fluid passages F1 to Fn are joined together and integrated into the single measurement fluid passage at the downstream side. Therefore, the gas flowing through the measurement fluid passages F1 to Fn is joined together at the downstream side into a single gas flow which then reaches the outlet section 7.

While the gas is flowing through the measurement fluid passages F1 to Fn, respectively, the flow value measuring units M1 to Mn measure the flow values Q1 to Qn of the gas flowing through the measurement fluid passages F1 to Fn, respectively. A total flow value Qt of the gas flowing through the measurement fluid passage section 2a is calculated according to the following formula (formula 1):

$$Qt = Q1 + Q2 + + Qn \quad (1)$$

The calculation unit 5 performs this calculation. Specifically, when the measurement fluid passages F1 to Fn measure the flow values of the gas flowing therethrough, they output measurement flow values to the calculation unit 5 through the wire 10. The calculation unit 5 receives the measurement flow values from the measurement fluid passages F1 to Fn, and sums up these measurement flow values to derive the total flow value Qt, as indicated by the formula (1).

In addition, the control unit is configured to perform control for the operation of the monitoring measurement fluid passage in such a manner that it decides as the monitoring measurement fluid passage, the measurement fluid passage including an arbitrary flow value measuring unit, of the flow value measuring units M1 to Mn, and causes the flow value measuring unit of only the monitoring measurement fluid passage to continue to measure the flow value, based on the result of the calculation performed by the calculation unit 5.

The control unit 3 is also configured to determine whether or not to supply electric power from the power supply unit 4 to the flow value measuring units M1 to Mn, based on the result of the calculation performed by the calculation unit 5.

Next, a method of controlling the stop process, the monitoring process, and the restoration (resuming) process in the flow value measuring process performed by the flow value measuring units M1 to Mn, will be described in more detail, with reference to the flowchart of FIG. 2.

Now, it is supposed that the flow value measuring process for measuring the gas flow value in the flow meter device 1 has started. At this time, the flow value measuring units M1 to Mn of all of the measurement fluid passages F1 to Fn perform the flow value measuring process (step S1). Then, the calculation unit 5 calculates the total flow value (Qt) of the obtained flow values. In this way, the flow meter device 1 can obtain the flow value of the gas flowing through the pipe member 8. Then, the calculation unit 5 determines whether or not the total flow value is smaller than the predetermined value Qs (first predetermined value) (step S2). When the calculation unit 5 determines that the total flow value is not smaller than the predetermined value Qs, the flow value measuring units M1 to Mn perform the flow value measurement (step S1) again.

The calculation unit 5 performs this determination process (step S2).

When the calculation unit 5 determines that the total flow value (Qt) is smaller than the predetermined value Qs, the control unit 3 decides an arbitrary measurement fluid passage as a monitoring measurement fluid passage for monitoring whether or not there is a change in the flow value of the gas flowing through the flow meter device 1. Then, the control unit 3 performs the measuring operation stop process (S3) in such a manner that the control unit 3 causes the flow value measuring unit of the monitoring measurement fluid passage to continue the measuring operation of the gas flow value, and the flow value measuring units of the measurement fluid passages which are other than the monitoring measurement fluid passage to stop the measuring operations of the gas flow values. As defined herein, the measuring operation stop process refers to a process for causing the flow value measuring units included in the measurement fluid passages which are other than the monitoring measurement fluid passage to stop the operations associated with the flow value measurement. For example, the measuring operation stop process may be a process in which a member such as a sensor which is associated with the flow value measurement is placed in a stand-by state in which its function is deactivated. Or, the measuring operation stop process may be a process in which the electric power supplied from the power supply unit 4 to the flow value measuring units included in the measurement fluid passages which are other than the monitoring measurement fluid passage, is cut-off, to stop the operations of the flow value measuring units.

The control unit 3 performs the measuring operation stop process (S3) in such a manner that the control unit 3 controls the flow value measuring units included in the measurement fluid passages which are other than the monitoring measurement fluid passage, based on the result of the processing performed by the calculation unit 5.

For example, it is supposed that the monitoring measurement fluid passage is the measurement fluid passage F1. The measuring operations performed by the flow value measuring units which are other than the flow value measuring unit M1 corresponding to the measurement fluid passage F1 are stopped in response to a control command from the control unit 3.

In this case, as the monitoring measurement fluid passage, the measurement fluid passage corresponding to a smallest flow value, or the measurement fluid passage corresponding to a largest flow value, may be chosen, from among the plural measurement fluid passages F1 to Fn. In other words, the measurement fluid passage corresponding to a smallest measurement flow value, of the measurement flow values of the plural measurement fluid passages F1 to Fn, or the measurement fluid passage corresponding to a largest measurement flow value, of the measurement flow values, may be chosen as the monitoring measurement fluid passage. Or, the measurement fluid passage to be chosen as the monitoring measurement fluid passage may be sequentially changed with a passage of time.

In a case where the measurement fluid passage corresponding to the smallest measurement flow value, is chosen as the monitoring measurement fluid passage, the reliability of detection of a change in the flow value can be made higher. When the flow of the gas in the measurement fluid passage corresponding to a small gas flow value can be detected, it may be determined that the gas is flowing at larger amounts, in the other measurement fluid passages. Therefore, in this configuration, after the state in which the fluid is flowing at a specified flow value through each of all of the measurement fluid passages, is formed, it is determined whether or not the flow value measuring units of the deactivated measurement fluid passages should resume the measuring operations. As a result, it can be determined whether or not there are changes in the flow values with a higher reliability, for all of the measurement fluid passages.

Conversely, in a case where the measurement fluid passage corresponding to the largest gas flow value, is chosen as the monitoring measurement fluid passage, a change in the flow value in this measurement fluid passage can be detected earlier than that in the other measurement fluid passages. The reason is as follows. The measurement fluid passage corresponding to the largest gas flow value refers to a measurement fluid passage having a largest cross-sectional area among the plural measurement fluid passages arranged in parallel. Since the gas flows at a larger amount through the measurement fluid passage which has a larger cross-sectional area and thereby generates a smaller pressure loss, the determination as to the measurement of the gas flow value can be performed earlier.

In a case where the measurement fluid passage to be chosen as the monitoring measurement fluid passage is sequentially changed with a passage of time, even when a failure occurs in any one of the measurement fluid passages chosen as the monitoring measurement fluid passage, the flow value measuring unit included in the measurement fluid passage in which there is no failure can reliably monitor a change in the flow value of the gas flowing through the measurement fluid passage.

After that, only the flow value measuring unit included in the measurement fluid passage chosen as the monitoring measurement fluid passage performs the flow value measuring process of the gas (step S4), to monitor a change in the flow value.

Subsequently, it is determined whether or not the flow value of the gas flowing through the monitoring measurement fluid passage is equal to or larger than a predetermined value Qm (second predetermined value) (step S5). When it is determined that the flow value is smaller than the predetermined value Qm, the measurement of the flow value of the gas flowing through the monitoring measurement fluid passage is performed again (step S4). The calculation unit 5 performs this determination process of step S5.

Conversely, when it is determined that the flow value of the gas flowing through the monitoring measurement fluid passage is equal to or larger than the predetermined value Qm, the measuring operation restoration process for resuming the measuring operations of the flow value measuring units included in all of the measurement fluid passages is performed (step S6).

The control unit 3 performs the measuring operation restoration process (step S6) by controlling the flow value measuring module 2b, based on the result of the processing performed by the calculation unit 5.

This will be described specifically. For example, it is supposed that the monitoring measurement fluid passage is the measurement fluid passage F1. When the calculation unit 5 determines that the flow value of the gas flowing through the monitoring measurement fluid passage (measurement fluid passage F1) is equal to or larger than the predetermined value Qm, the control unit 3 performs control to cause the flow value measuring units M2 to Mn which are other than the flow value measuring unit M1, to resume the measuring operations, based on the result of the determination performed by the calculation unit 5.

After that, the process returns to its initial state. The flow value measuring units M1 to Mn perform the flow value measuring process (step S1) to measure the flow value of the gas flowing through the flow meter device 1.

The above described predetermined value Qs of the flow value is, for example, a predetermined value which is close to zero. Specifically, the predetermined value Qs is set in a range which is deemed as a zero flow value in view of a measurement error of the fluid flow value due to non-uniformity of results of the measurement performed by the measuring system such as the flow value measuring units M1 to Mn. If the flow value of the gas flowing through the measurement fluid passage chosen as the monitoring measurement fluid passage is substantially zero, it is not necessary to measure the flow values of the gas flowing through the measurement fluid passages which are other than the monitoring measurement fluid passage, in principle. Because of this, for example, in a case where the flow value of the gas flowing through the measurement fluid passages is substantially zero, in the case of the flow meter device 1 according to Embodiment 1, any one of the measurement fluid passages is chosen as the monitoring measurement fluid passage for which the timing when the gas started to flow is detected. The measurement of the gas flow values in the measurement fluid passages which are other than the monitoring measurement fluid passage may be stopped. Therefore, the flow meter device 1 can reduce the electric power consumption required for the measurement of the gas flow value.

Also, when the flow value increases and becomes equal to or larger than the predetermined value Qm which is larger than the predetermined value Qs which is substantially close to zero and from which it can be determined that the device started to use the gas, in a state in which only the monitoring measurement fluid passage is performing the flow value measuring process in the flow meter device 1, the deactivated flow value measuring units can be immediately restored to a state of the flow value measuring process in which they resume normal flow value measurement. In other words, when the gas starts to flow again, the flow value measurement for the respective measurement fluid passages can be resumed reliably. As a result, a flow value measurement accuracy is not degraded.

Figure 3:
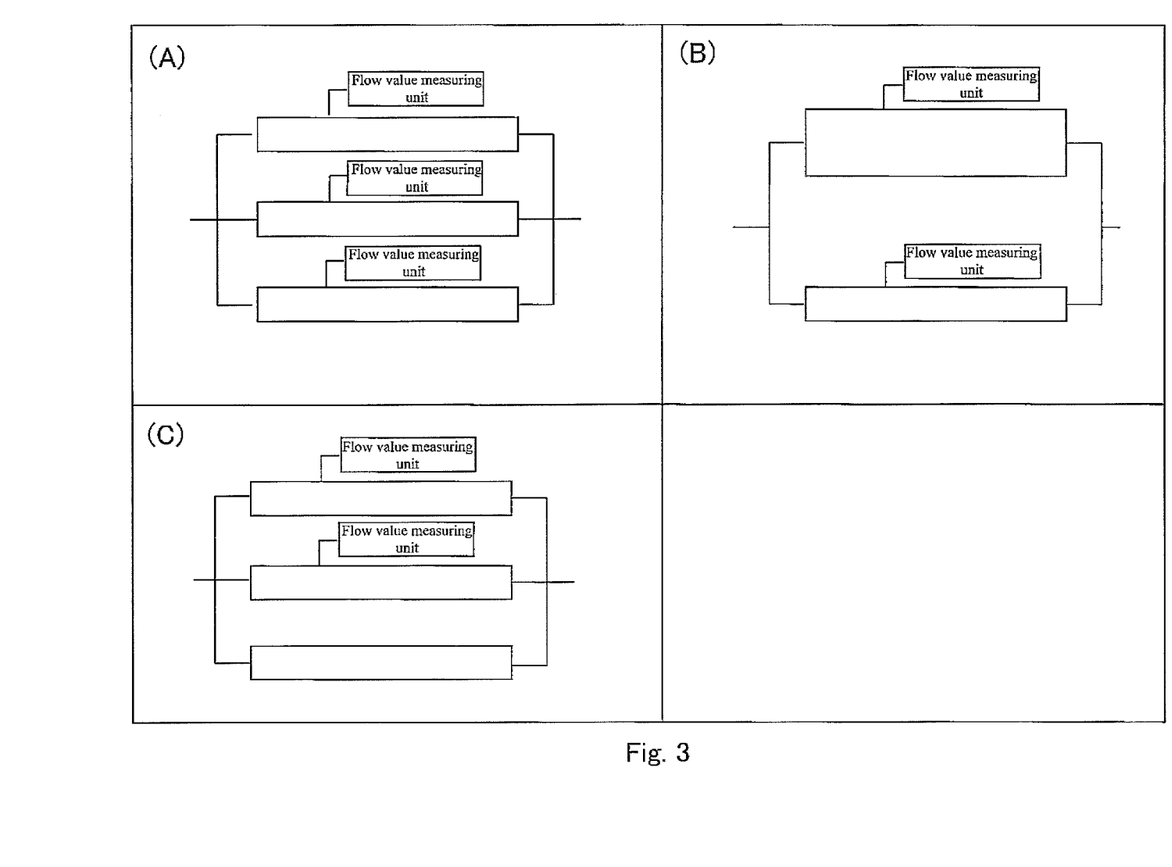
FIG. 3 is a table showing the exemplary configurations of measurement fluid passages of the flow meter device according to the embodiment of the present invention.

Although in the present embodiment, the fluid passages are schematically drawn, the fluids flow through the respective fluid passages at a uniform flow value or non-uniform flow values. Specifically, as indicated by (A) of the table of FIG. 3, the cross-sectional areas of the plural measurement fluid passages placed in parallel in the flow meter device 1 may be equal to each other, the lengths thereof may be equal to each other, and the flow values of the gas flowing though the measurement fluid passages may be uniform. Or, as indicated by (B) of the table of FIG. 3, the cross-sectional areas of the plural measurement fluid passages placed in parallel in the flow meter device 1 may be different from each other, the lengths thereof may be different from each other, and the flow values of the gas flowing though the measurement fluid passages may be non-uniform. FIG. 3 is a table showing the exemplary configurations of the measurement fluid passages of the flow meter device 1 according to the present embodiment.

Especially, in the configuration in which the flow values of the gas flowing though the plural measurement fluid passages are non-uniform, when the measurement fluid passage which is smallest in the measured gas flow value is chosen as the monitoring measurement fluid passage, this monitoring measurement fluid passage is the fluid passage which is smallest in electric power consumption required for measurement of the gas flow value. Therefore, in a case where the flow value of the gas flowing through the flow meter device 1 is substantially zero, the measuring operations of the other flow value measuring units which are large in electric power consumption can be stopped. This can further reduce electric power consumption.

Alternatively, in the configuration in which the flow values of the gas flowing though the plural measurement fluid passages are non-uniform, the measurement fluid passage corresponding to a largest measurement gas flow value may be chosen as the monitoring measurement fluid passage. In this case, since it can be determined earlier whether or not to restore the flow value measuring unit to the flow value measuring process, a measurement accuracy can be improved. Specifically, the measurement fluid passage corresponding to the largest measurement gas flow value is the measurement fluid passage having a largest cross-sectional area among the plural measurement fluid passages placed in parallel. Since the gas flows at a larger amount through the measurement fluid passage which has a larger cross-sectional area and thereby generates a smaller pressure loss, the determination as to the measurement of the gas flow value can be performed earlier.

In the flow meter device 1 according to Embodiment 1, any one of the plural measurement fluid passages F1 to Fn is chosen as the monitoring measurement fluid passage, and a change in the gas flow value in this monitoring measurement fluid passage is monitored. However, this configuration is merely exemplary. For example, plural measurement fluid passages may be chosen as the monitoring measurement fluid passages, and changes in the gas flow values in these monitoring measurement fluid passages may be monitored. The flow meter device 1 so configured will now be described as Embodiment 2.

Embodiment 2

Figure 4:
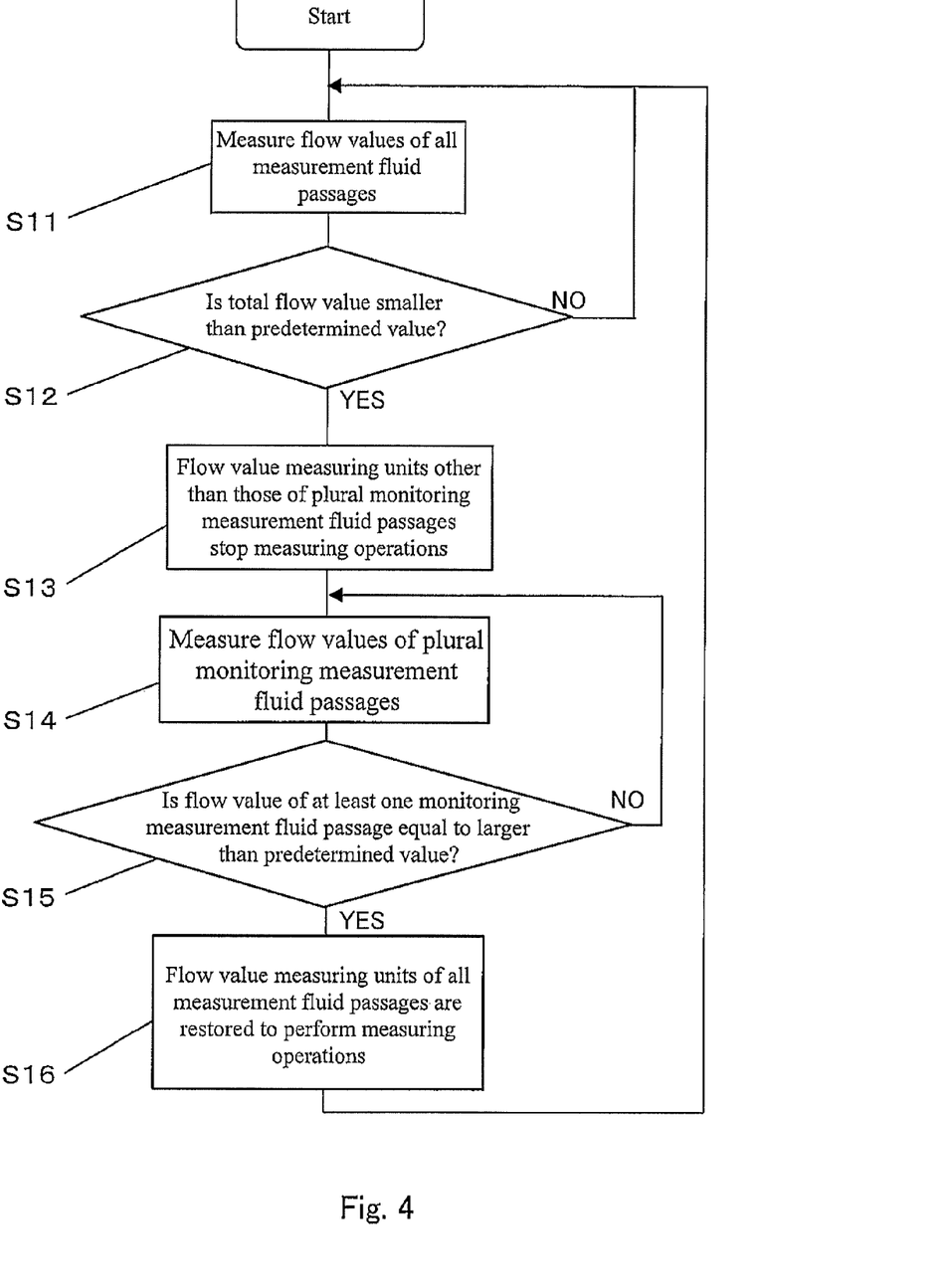
FIG. 4 is a flowchart showing an example of a stop process, a monitoring process, and a restoration (resuming) process in a flow value measuring process, of a flow meter device according to Embodiment 2 of the present invention.

The configuration of a flow meter device 1 according to Embodiment 2 is substantially the same as that of the flow meter device 1 according to Embodiment 1, and will not be described repeatedly. Regarding the processing in the stop process, the monitoring process, and the restoration (resuming) process in the flow value measuring process, which are different from those of Embodiment 1, will be described with reference to FIG. 4. FIG. 4 is a flowchart showing an example of the stop process, the monitoring process, and the restoration (resuming) process in the flow value measuring process, of the flow meter device 1 according to Embodiment 2 of the present invention.

With reference to the flowchart of FIG. 4, in step S11, the flow value measuring units M1 to Mn of all of the measurement fluid passages F1 to Fn perform the flow value measuring process. Then, in step S12, it is determined whether or not the total flow value Qt which is a sum of the flow values measured by the flow value measuring units M1 to Mn is smaller than the predetermined value Qs. When it is determined that the total flow value is smaller than the predetermined value Qs in the determination of step S12 ("YES" in step S12), the process moves to step S13. Conversely, when it is determined that the total flow value is equal to or larger than the predetermined value Qs in step S12 ("NO" in step S12), the process returns to step S11 and the steps are repeated. In step S13, the measuring operation stop process is performed in such a manner that the flow value measuring units included in the measurement fluid passages which are other than plural monitoring measurement fluid passages are caused to stop the measuring operations. Then, in step S14, the flow value measuring units included in the plural monitoring measurement fluid passages perform the flow value measuring process. Then, in step S15, it is determined whether or not the flow value of at least one monitoring measurement fluid passage which is measured in step S14 is equal to or larger than the predetermined value Qm. When it is determined that the flow value of the monitoring measurement fluid passage is equal to or larger than the predetermined value Qm ("YES" in step S15), the process moves to step S16. In step S16, the measuring operation restoration process for restoring the flow value measuring units of all of the deactivated measurement fluid passages, to the state in which they resume the measuring operations, is performed. Conversely, when it is determined as "NO" in step S15, the process returns to step S14, and the flow values of the gas flowing through the monitoring measurement fluid passages continue to be measured.

Hereinafter, the operation and advantages of the flow meter device 1 which is configured and performs the processing flow as described above will be described more specifically. In the flowchart of FIG. 4, step S11 and step S12 are the same as step S1 and step S2 in the flow meter device 1 according to Embodiment 1, and will not be described repeatedly.

When the calculation unit 5 determines that the total flow value (Qt) is smaller than the predetermined value Qs, in step S12, the control unit 3 chooses plural arbitrary measurement fluid passages as monitoring measurement fluid passages for monitoring whether or not there is a change in the flow value of the gas flowing through the flow meter device 1. Then, the control unit 3 performs the measuring operation stop process (S13) in such a manner that the control unit 3 causes the flow value measuring units of the monitoring measurement fluid passages to continue the measuring operations of the gas flow values, and the flow value measuring units of the measurement fluid passages which are other than the monitoring measurement fluid passages to stop the measuring operations. As defined herein, the measuring operation stop process refers to a process for causing the flow value measuring units included in the measurement fluid passages which are other than the chosen plural monitoring measurement fluid passages to stop the operations associated with the flow value measurement. For example, the measuring operation stop process may be a process in which a member such as a sensor which is associated with the flow value measurement is placed in a stand-by state in which its function is deactivated. Or, the measuring operation stop process may be a process in which the electric power supplied from the power supply unit 4 to the flow value measuring units included in the measurement fluid passages which are other than the monitoring measurement fluid passages, is cut-off, to stop the operations of the flow value measuring units.

The control unit 3 performs the measuring operation stop process (S13) in such a manner that the control unit 3 causes the flow value measuring units included in the measurement fluid passages which are other than the monitoring measurement fluid passages, to stop the measuring operations, based on the result of the processing performed by the calculation unit 5.

For example, it is supposed that the monitoring measurement fluid passages are the measurement fluid passage F1 and the measurement fluid passage F2. The measuring operations of the flow value measuring units M3 to Mn which are other than the flow value measuring unit M1 and the flow value measuring unit M2 corresponding to the measurement fluid passage F1 and the measurement fluid passage F2, respectively, are stopped in response to a control command from the control unit 3.

After that, only the flow value measuring unit M1 and the flow value measuring unit M2 included in the plural measurement fluid passages chosen as the monitoring measurement fluid passages perform the flow value measurement (step S14), to monitor changes in the gas flow values.

Subsequently, it is determined whether or not the flow value of the gas flowing through at least one monitoring measurement fluid passage is equal to or larger than the predetermined value Qm (step S15). When it is determined that the flow value is smaller than the predetermined value Qm, the measurement of the flow values of the gas flowing through the monitoring measurement fluid passages is performed again (step S14). The calculation unit 5 performs this determination process of step S15.

There are various methods as the above described method of monitoring the gas flow value in the monitoring measurement fluid passage.

As one method, for example, the monitoring measurement fluid passage is fixed (fixedly set). In this case, a change in the gas flow value can be monitored by using the monitoring measurement fluid passage having a fixed fluid passage characteristic (measurement accuracy).

As another method of monitoring the gas flow value in the monitoring measurement fluid passage, the measurement fluid passage to be chosen as the monitoring measurement fluid passage may be changed sequentially with a passage of time. In this case, even when a failure occurs in the flow value measuring unit included in the measurement fluid passage chosen as the monitoring measurement fluid passage, the flow value measuring unit included in the measurement fluid passage which is newly chosen as the monitoring measurement fluid passage after a passage of predetermined time can accurately measure the gas flow value. This can lessen a possibility that the flow value measuring unit included in the measurement fluid passage chosen as the monitoring measurement fluid passage cannot detect a change in the gas flow value due to the failure in this flow value measuring unit.

Then, when it is determined that the flow value of the gas flowing through at least one monitoring measurement fluid passage is equal to or larger than the predetermined value Qm, the measuring operation restoration process (step S16) is performed in such a manner that the flow value measuring units M3 to Mn included in all of the deactivated measurement fluid passages F3 to Fn, to resume the measuring operations.

As a matter of course, it may be determined whether or not the flow values of the gas flowing through two or more monitoring measurement fluid passages, instead of one monitoring measurement fluid passage, are equal to or larger than the predetermined value Qm, to decide whether or not to resume the measuring operations of the flow value measuring units included in the measurement fluid passages. In the flow meter device 1 configured in this way, a change in the flow value of the gas flowing through the monitoring measurement fluid passage can be monitored with a higher reliability.

The control unit 3 performs the measuring operation restoration process (step S16) by controlling the flow value measuring module 2b, based on the result of the processing performed by the calculation unit 5.

This will be described specifically. For example, it is supposed that the monitoring measurement fluid passages are the measurement fluid passage F1 and the measurement fluid passage F2. When the calculation unit 5 determines that at least one of the flow values of the gas flowing through the monitoring measurement fluid passages (measurement fluid passages F1, F2) is equal to or larger than the predetermined value Qm, the control unit 3 performs control to cause the flow value measuring units M3 to Mn which are other than the flow value measuring unit M1 and the flow value measuring unit M2, to be restored to the state in which they resume the measuring operations, based on the determination performed by the calculation unit 5.

After that, the process returns to the initial state, and the flow value measuring units M1, M2, . . . , Mn perform the flow value measurement (step S11).

As described above, the above predetermined values Qs and Qm are the predetermined values which are close to zero. If the flow value is substantially zero, it is not necessary to measure the flow values of the gas flowing through the measurement fluid passages which are other than the monitoring measurement fluid passages, in principle. Therefore, by deciding the arbitrary plural measurement fluid passages as the monitoring measurement fluid passages for which the timings at which the gas started to flow, are detected, in the case of the flow meter device 1 according to Embodiment 2, the measuring operations of the gas flow values in the measurement fluid passages which are other than the monitoring measurement fluid passages can be stopped, when the flow values of the gas flowing through the monitoring measurement fluid passages are substantially zero. For this reason, the flow meter device 1 can reduce the electric power consumption required to measure the gas flow value. Especially, in the flow meter device 1 according to Embodiment 2, since the plural measurement fluid passages are chosen as the monitoring measurement fluid passages, the reliability of the monitoring of a change in the gas flow value can be made higher.

Also, in a case where the flow value increases and becomes equal to or larger than the predetermined value Qm which is substantially zero, in a state in which only the plural monitoring measurement fluid passages are measuring the gas flow values in the flow meter device 1, all of the deactivated flow value measuring units M3 to Mn can be restored immediately to the state in which they resume the normal flow value measurement. In other words, when the gas starts to flow again, the measurement fluid passages F1 to Fn can resume the flow value measurement with a high reliability. As a result, a flow value measurement accuracy is not degraded.

The flow meter device 1 according to Embodiment 1 and the flow meter device 1 according to Embodiment 2 are configured such that the total flow value of the gas flowing through the flow meter device 1 is derived by summing-up the flow values of the gas flowing through the measurement fluid passages F1 to Fn. However, this configuration is merely exemplary. For example, the total flow value of the gas flowing through the flow meter device 1 may be derived from the flow value of the gas flowing through one measurement fluid passage. This configuration will now be described as Embodiment 3.

Embodiment 3

The configuration of a flow meter device 1 according to Embodiment 3 is substantially the same as that of the flow meter device 1 according to Embodiment 1, except for the configuration for deriving the total flow value of the gas flowing through the flow meter device 1. Specifically, the flow meter device 1 according to Embodiment 3 is configured as follows. Initially, the flow value measuring units M1 to Mn measure the flow values Q1 to Qn of the measurement fluid passages F1 to Fn, respectively. Then, the total flow values Qt are derived from the flow values Q1 to Qn measured in the measurement fluid passages F1 to Fn, respectively. In other words, the total flow value Qt of the gas flowing through the flow meter device 1 can be derived from the flow value of any one of the measurement fluid passages. Therefore, the flow meter device 1 according to Embodiment 3 constructs a redundant system as a whole. The other configuration of the flow meter device 1 according to Embodiment 3 is substantially the same as that of the flow meter device 1 according to Embodiment 1, and will not be described repeatedly.

Figure 5:
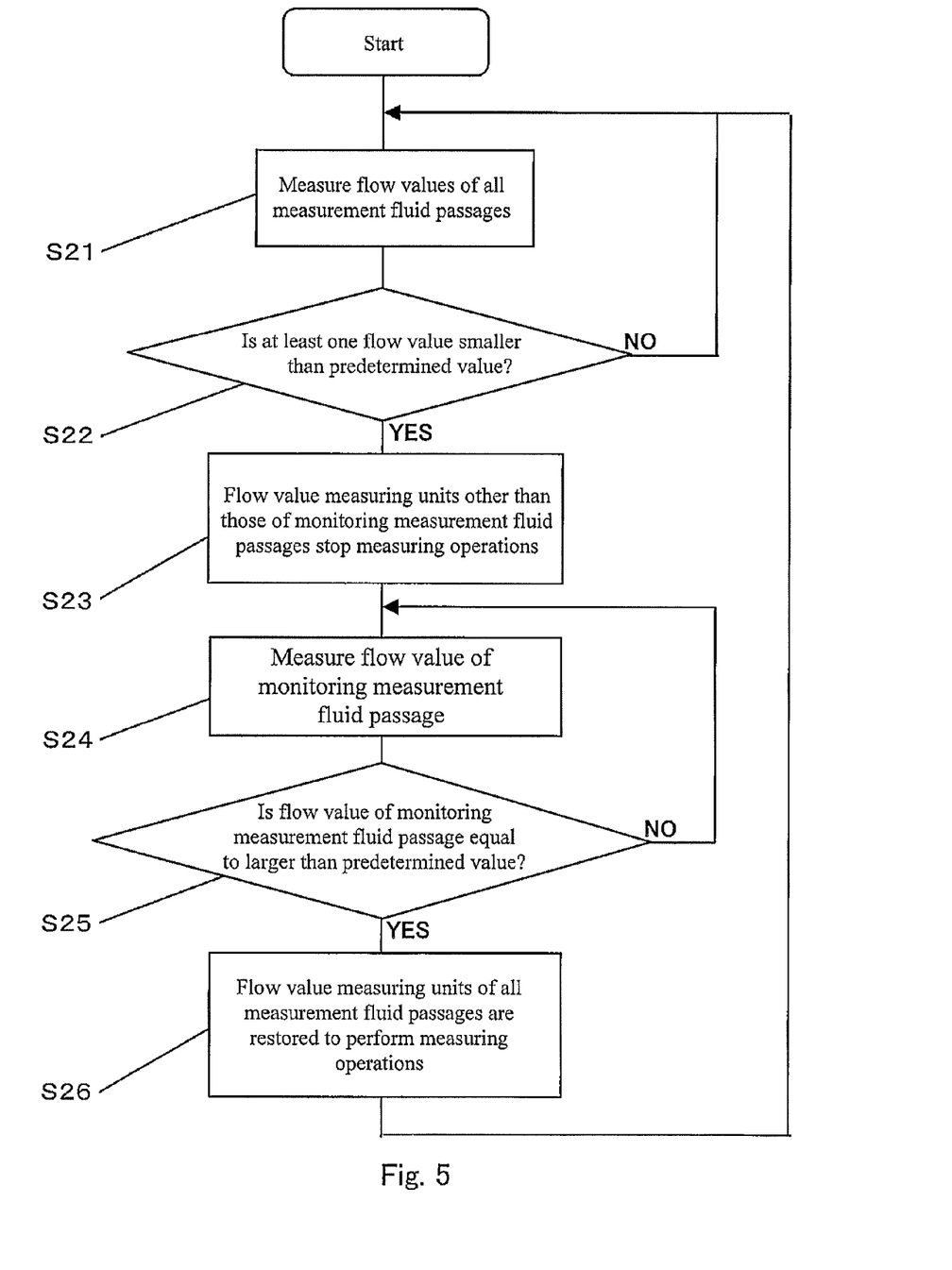
FIG. 5 is a flowchart showing an example of a stop process, a monitoring process, and a restoring (resuming) process in a flow value measuring process, of a flow meter device 1 according to Embodiment 3 of the present invention.

Next, regarding the processing in the stop process, the monitoring process, and the restoration (resuming) process in the flow value measuring process, which are different from those of Embodiment 1, will be described with reference to FIG. 5. FIG. 5 is a flowchart showing an example of the stop process, the monitoring process, and the restoration (resuming) process in the flow value measuring process, of the flow meter device 1 according to Embodiment 3 of the present invention.

With reference to the flowchart of FIG. 5, in step S21, the flow value measuring units M1 to Mn included in all of the measurement fluid passages F1 to Fn perform the flow value measuring process. In step S22, the total flow values Qt are derived from the flow values measured by the flow value measuring units M1 to Mn, respectively, and it is determined whether or not at least one of these total flow values Qt is smaller than the predetermined value Qs. Then, when it is determined that at least one of the total flow values Qt is smaller than the predetermined value Qs in the determination of step S22 ("YES" in step S22), the process moves to step S23. When it is determined that at least one of the total flow values Qt is equal to or larger than the predetermined value Qs ("NO" in step S22), the process moves to step S21 and the steps are repeated.

The calculation unit 5 performs the determination process in step S22.

When at least one of the total flow values Qt is smaller than the predetermined value Qs, the control unit 3 causes the flow value measuring unit of arbitrary one measurement fluid passage chosen as the monitoring measurement fluid passage for monitoring whether or not there is a change in the flow value, to continue the measuring operation, and the flow value measuring units of the measuring fluid passages which are other than the monitoring measurement fluid passage to stop the measuring operations (step S23). Step S23 and the following steps are similar to those of Embodiment 1, and will not be described repeatedly.

Although in the flow meter device 1 according to Embodiment 3, all of the plural measurement fluid passages F1 to Fn include the flow value measuring units M1 to Mn, respectively, as in the configuration of Embodiment 1, this configuration is merely exemplary. As described above, the flow meter device 1 according to Embodiment 3 is configured to derive the total flow value of the gas flowing through the whole flow meter device 1, from the flow value measured by the flow value measuring unit of one measurement fluid passage. Therefore, for example, as indicated by (C) of the table of FIG. 3, the flow value measuring units may be provided in only a part (at least two or more fluid passages) of the plural fluid passages arranged in parallel. In other words, the fluid passages which do not include the flow value measuring units may be arranged in parallel with the plural measurement fluid passages including the flow value measuring units. In this configuration, the control unit 3 chooses the measurement fluid passage which will become the monitoring measurement fluid passage, from among the fluid passages (measurement fluid passages) including the flow value measuring units.

Although in Embodiment 1 to Embodiment 3 described above, the target fluid (measurement target fluid) to be measured by the flow meter device 1 is the gas, the target fluid is not limited to the gas, but may be, for example, a liquid. That is, the measurement target fluid may be any fluid so long as the flow value per unit time is required to be obtained.

It may be said that the flow meter device 1 of the present invention has the following configuration. Specifically, the flow meter device 1 of the present invention may comprise plural measurement fluid passages through which a measurement target fluid flows; plural flow value measuring units installed in the plural measurement fluid passages, respectively, and output flow value signals corresponding to flow values of the measurement target fluid; and a control unit configured to control the measuring operations of the flow value measuring units, wherein the control unit may be configured to perform control to cause the flow value measuring units to stop, monitor, and restore the measuring operations, based on the flow value signals received from the flow value measuring units. This makes it possible to control the number of the flow value measuring units which perform the measuring operations corresponding to the measured flow values, and hence reduce electric power consumption.

Also, the flow meter device 1 of the present invention may comprise plural measurement fluid passages through which a measurement target fluid flows; plural flow value measuring units installed in the plural measurement fluid passages, respectively, and output flow value signals corresponding to flow values of the measurement target fluid; a flow value calculation unit configured to calculate the flow values based on the flow value signals received from the flow value measuring units; and a control unit configured to control the measuring operations of the flow value measuring units, wherein the control unit may be configured to perform control to cause only one of the plural flow value measuring units to perform the measuring operation as the flow value measuring unit of the monitoring measurement fluid passage and the flow value measuring units which are other than this flow value measuring unit to stop the measuring operations, when a total flow value of the flow values of the measurement fluid passages which are calculated by the flow value calculation unit is equal to or smaller than a predetermined value. In this configuration, when the measured flow value is smaller than the predetermined value, only one monitoring flow value measuring unit performs the measuring operation. Therefore, the electric power consumption for the flow value measurement can be reduced.

In the above described configuration, in particular, the flow meter device 1 of the present invention may be configured such that the predetermined value is set to a substantially zero flow value. In a case where the flow value is substantially zero, it is not necessary to measure the flow values of all of the fluid passages, in principle. In other words, it is sufficient that only the monitoring measurement fluid passage measures the flow value. Therefore, the electric power consumption for the flow value measurement can be reduced.

In the above described configuration, in particular, the flow meter device 1 of the present invention may be configured such that the flow value measuring unit corresponding to a smallest flow value is chosen as the monitoring flow value measuring unit, from among the plural flow value measuring units. In this configuration, it is determined whether or not to restore the flow value measuring units to the state in which they resume the measuring operations, after each of the flow values corresponding to all of the fluid passages reaches a specified flow value. Therefore, reliability of the flow value measurement can be improved.

In the above described configuration, in particular, the flow meter device 1 of the present invention may be configured such that the flow value measuring unit corresponding to a largest flow value is chosen as the monitoring flow value measuring unit, from among the plural flow value measuring units. In this configuration, it can be determined earlier whether or not to restore the flow value measuring units to the state in which they resume the measuring operations. Therefore, the measurement accuracy can be improved.

In the above described configuration, in particular, the flow meter device 1 of the present invention may be configured such that the monitoring flow value measuring unit is changed among the plural flow value measuring units, sequentially with a passage of time. In this configuration, even when a failure occurs in the flow value measuring unit of any one of the monitoring measurement fluid passages, the monitoring measurement fluid passage in which there is no failure can perform the monitoring operation. In this way, the flow meter device can function as a fail safe system.

In the above described configuration, in particular, the flow meter device 1 of the present invention may be configured such that in a state in which only one flow value measuring unit is activated as the flow value measuring unit of the monitoring measurement fluid passage, the control unit performs control to cause the flow value measuring units which are other than the flow value measuring unit of the monitoring measurement fluid passage to be restored to the state in which they resume the measuring operations, when the flow value measured by the flow value measuring unit of the monitoring measurement fluid passage is equal to or larger than the predetermined value. In this configuration, in a case where the flow value increases, in a state in which only the monitoring measurement fluid passage is monitoring the flow value, the flow value measuring units of all of the measurement fluid passages can be restored immediately to the state in which they resume normal flow value measurement. Therefore, the flow value measurement can be continued with a reliability, and hence the flow value measurement accuracy is not degraded.

In the above described configuration, in particular, the flow meter device 1 of the present invention may be configured such that the predetermined value is set to a substantially zero flow value. In this configuration, it can be detected that the fluid started to substantially flow, and all of the measurement fluid passages can be restored to the state of the flow value measurement. Therefore, the flow value measurement can be continued with a reliability, and hence the flow value measurement accuracy is not degraded.

Also, it may be said that the flow meter device 1 of the present invention has the following configuration. Specifically, the flow meter device 1 of the present invention may comprise plural measurement fluid passages through which a measurement target fluid flows; plural flow value measuring units installed in the plural measurement fluid passages, respectively, and output flow value signals corresponding to flow values of the measurement target fluid; a flow value calculation unit configured to calculate the flow values based on the flow value signals received from the flow value measuring units; and a control unit configured to control the measuring operations of the flow value measuring units, wherein the control unit may be configured to perform control to cause only one of the plural flow value measuring units to perform the measuring operation as the flow value measuring unit of the monitoring measurement fluid passage and the flow value measuring units which are other than the flow value measuring unit of the monitoring measurement fluid passage to stop the measuring operation, when at least one of the flow values of the measurement fluid passages which are calculated by the flow value calculation unit is equal to or smaller than a predetermined value. In this configuration, in a case where the measured flow value is smaller than the predetermined value, only the flow value measuring unit included in one monitoring measurement fluid passage performs the measuring operation. Therefore, the electric power consumption for the flow value measurement can be reduced.

In the above described configuration, in particular, the flow meter device 1 of the present invention may be configured such that the predetermined value is set to a substantially zero flow value. In a case where the flow value is substantially zero, it is not necessary to measure the flow values of all of the measurement fluid passages, in principle. In other words, it is sufficient that only the monitoring measurement fluid passage performs the flow value measurement. Therefore, the electric power consumption for the flow value measurement can be reduced.

In the above described configuration, in particular, the flow meter device 1 of the present invention may be configured such that the flow value measuring unit corresponding to a smallest flow value is chosen as the monitoring flow value measuring unit, from among the plural flow value measuring units. In this configuration, it is determined whether or not to restore the flow value measuring units to the state in which they resume the measuring operations, after each of the flow values of all of the fluid passages reaches a specified flow value. Therefore, reliability of the flow value measurement can be improved.

In the above described configuration, in particular, the flow meter device 1 of the present invention may be configured such that the flow value measuring unit corresponding to a largest flow value is chosen as the monitoring flow value measuring unit, from among the plural flow value measuring units. In this configuration, it can be determined earlier whether or not to restore the flow value measuring units to the state in which they resume the measuring operations. Therefore, the measurement accuracy can be improved. In the above described configuration, in particular, the flow meter device 1 of the present invention may be configured such that the monitoring flow value measuring unit is changed among the plural flow value measuring units, sequentially with a passage of time. In this configuration, even when a failure occurs in the flow value measuring unit of any one of the monitoring measurement fluid passages, the monitoring measurement fluid passage in which there is no failure can perform the monitoring operation. In this way, the flow meter device can function as a fail safe system.

In the above described configuration, in particular, the flow meter device 1 of the present invention may be configured such that in a state in which only one flow value measuring unit is activated as the flow value measuring unit of the monitoring measurement fluid passage, the control unit performs control to cause the flow value measuring units which are other than the flow value measuring unit of the monitoring measurement fluid passage to be restored to the state in which they resume the measuring operations, when the flow value measured by the flow value measuring unit of the monitoring measurement fluid passage is equal to or larger than a predetermined value. In this configuration, in a case where the flow value increases, in a state in which only the monitoring measurement fluid passage is monitoring the flow value, all of the measurement fluid passages can be restored immediately to the state of the normal flow value measurement. Therefore, the flow value measurement can be continued with a reliability, and hence the flow value measurement accuracy is not degraded.

In the above described configuration, in particular, the flow meter device 1 of the present invention may be configured such that the predetermined value is set to a substantially zero flow value. In this configuration, it can be detected that the fluid started to substantially flow, and all of the measurement fluid passages can be restored to the state of the flow value measurement. Therefore, the flow value measurement can be continued with a reliability, and hence the flow value measurement accuracy is not degraded.

Also, it may be said that the flow meter device 1 of the present invention has the following configuration. Specifically, the flow meter device 1 of the present invention may comprise plural measurement fluid passages through which a measurement target fluid flows; plural flow value measuring units installed in the plural measurement fluid passages, respectively, and output flow value signals corresponding to flow values of the measurement target fluid; a flow value calculation unit configured to calculate the flow values based on the flow value signals received from the flow value measuring units; and a control unit configured to control measuring operations of the flow value measuring units, wherein the control unit may be configured to perform control to cause at least two of the plural flow value measuring units to perform the measuring operations and the flow value measuring units which are other than the two flow value measuring units to stop the measuring operations, when the total flow value of the flow values of the measurement fluid passages which are calculated by the flow value calculation unit is equal to or smaller than a predetermined value. In this configuration, when the measured flow value is smaller than the predetermined value, only the monitoring flow value measuring unit may perform the measuring operation. As a result, the electric power consumption for the flow value measurement can be reduced.

In the above described configuration, in particular, the flow meter device 1 of the present invention may be configured such that a specified flow value measuring unit is fixed as the flow value measuring unit which performs the monitoring operation. In this configuration, since the specified flow value measuring unit is always fixed as the flow value measuring unit which performs the monitoring operation, it becomes possible to prevent a difference in measurement values due to a difference in accuracy among the flow value measuring units. As a result, the flow value can be monitored by using the fixed characteristics.

In the above described configuration, in particular, the flow meter device 1 of the present invention may be configured such that the flow value measuring unit which performs the monitoring operation is changed sequentially with a passage of time. In this configuration, even when a failure occurs in the flow value measuring unit which performs the monitoring operation and cannot perform correct measuring operation, the flow value measuring unit which is newly chosen can measure the flow value. This can lessen a possibility that the monitoring operation cannot be performed correctly.

In the above described configuration, in particular, the flow meter device 1 of the present invention may be configured such that in a state in which at least two flow value measuring units are performing the monitoring operations, the control unit performs control to cause the flow value measuring units which are other than the two flow value measuring units to be restored to the state in which they resume the measuring operations, when at least one of the flow values measured by the two flow value measuring units is equal to or larger than a predetermined value. In this configuration, in a case where the fluid starts to flow and the flow value of the fluid increases, all of the measurement fluid passages can be restored immediately to the state of the normal flow value measurement. Therefore, the flow value measurement can be continued with a reliability, and hence the flow value measurement accuracy is not degraded.

In the above described configuration, in particular, the flow meter device 1 of the present invention may be configured such that in a state in which at least two flow value measuring units are performing the monitoring operations, the control unit performs control to cause the flow value measuring units which are other than the two flow value measuring units to be restored to the state in which they resume the measuring operations, when two or more of the flow values measured by the at least two flow value measuring units are equal to or larger than a predetermined value. In this configuration, the flow meter device 1 can determine that the flow value has increased, with a higher reliability. This makes it possible to appropriately resume the measuring operations of the deactivated flow value measuring units. Therefore, the flow value measurement can be continued, and reliability of the flow value measuring process can be made higher.

INDUSTRIAL APPLICABILITY

As described above, the flow meter device of the present invention is capable of measuring a larger flow value with reduced electric power consumption, and therefore is widely applicable to devices which are electrically driven by batteries, such as large-sized gas meters for business purposes or portable large flow value measuring units.

What is claimed is:
1. A flow meter device comprising:
plural fluid passages which are provided between an inlet section into which a fluid flows and an outlet section from which the fluid flows out, and through which the fluid flows;
flow value measuring units installed in the plural fluid passages, respectively, and configured to measure flow values of the fluid flowing through the fluid passages;
a calculation unit configured to sum up the flow values measured by the flow value measuring units included in the plural fluid passages to derive a total flow value of the fluid flowing through the flow meter device; and
a control unit configured to determine whether or not to cause one or more of the flow value measuring units to stop a measuring operation of the flow value based on the flow values measured by the flow value measuring units, and whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value;
wherein the control unit is configured to cause the flow value measuring units which are other than a specified flow value measuring unit as the monitoring measuring unit to stop the measuring operations of the flow values, when the total flow value of the fluid derived by the calculation unit is smaller than a first predetermined value.

2. The flow meter device according to claim 1, wherein the first predetermined value is deemed as a substantially zero flow value.

3. The flow meter device according to claim 1, wherein the control unit is configured to choose the flow value measuring unit corresponding to a smallest measurement flow value, as the monitoring measuring unit, from among the plural flow value measuring units.

4. The flow meter device according to claim 1, wherein the control unit is configured to choose the flow value measuring unit corresponding to a largest measurement flow value, as the monitoring measuring unit, from among the plural flow value measuring units.

5. The flow meter device according to claim 1, wherein the control unit is configured to change the flow value measuring unit chosen as the monitoring measuring unit from among the plural flow value measuring units, sequentially with a passage of time.

6. The flow meter device according to claim 1, wherein the control unit is configured to fix a specified flow value measuring unit as the monitoring measuring unit, among the plural flow value measuring units.

7. The flow meter device according to claim 1, wherein the control unit is configured to cause the flow value measuring units which are other than one monitoring measuring unit to resume the measuring operations, when the flow value measured by the monitoring measuring unit is equal to or larger than a second predetermined value, in a state in which only the one monitoring measuring unit is performing the measuring operation of the flow value of the fluid.

8. The flow meter device according to claim 7, wherein the second predetermined value is larger than the first predetermined value.

9. A flow meter device comprising:
plural fluid passages which are provided between an inlet section into which a fluid flows and an outlet section from which the fluid flows out, and through which the fluid flows;
flow value measuring units installed in the plural fluid passages, respectively, and configured to measure flow values of the fluid flowing through the fluid passages; and
a calculation unit configured to sum up the flow values measured by the flow value measuring units included in the plural fluid passages to derive a total flow value of the fluid flowing through the flow meter device;
a control unit configured to determine whether or not to cause one or more of the flow value measuring units to stop a measuring operation of the flow value based on the flow values measured by the flow value measuring units, and whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value;
wherein the control unit is configured to cause the flow value measuring units which are other than specified two or more flow value measuring units as the monitoring measuring units to stop the measuring operations of the flow values, when the total flow value of the fluid derived by the calculation unit is smaller than a first predetermined value.

10. The flow meter device according to claim 9, wherein the control unit is configured to cause the flow value measuring units which are other than at least two monitoring measuring units to resume the measuring operations, when the flow value measured by the monitoring measuring unit is equal to or larger than a second predetermined value, in a state in which the at least two monitoring measuring units are performing the measuring operations of the flow values of the fluid.

11. The flow meter device according to claim 10, wherein the second predetermined value is larger than the first predetermined value.

12. The flow meter device according to any one of claim 9, wherein the first predetermined value is deemed as a substantially zero flow value.

13. A flow meter device comprising:
plural fluid passages which are provided between an inlet section into which a fluid flows and an outlet section from which the fluid flows out, and through which the fluid flows;
flow value measuring units installed in the plural fluid passages, respectively, and configured to measure flow values of the fluid flowing through the fluid passages; and
a calculation unit configured to derive total flow values of the fluid flowing through the flow meter device, based on the flow values measured by the flow value measuring units included in at least two fluid passages of the plural fluid passages;
a control unit configured to determine whether or not to cause one or more of the flow value measuring units to stop a measuring operation of the flow value based on the flow values measured by the flow value measuring units, and whether or not to cause the one or more of the flow value measuring units to resume the measuring operation of the flow value, based on the flow value measured by the flow value measuring unit as a monitoring measuring unit which is other than the one or more of the flow value measuring units and is activated to perform the measuring operation of the flow value;
wherein the control unit is configured to cause the flow value measuring units which are other than a specified flow value measuring unit as the monitoring measuring unit to stop the measuring operations of the flow values, when the total flow value of the fluid derived by the calculation unit is smaller than a first predetermined value.

14. The flow meter device according to any one of claim 13, wherein the first predetermined value is deemed as a substantially zero flow value.

15. The flow meter device according to claim 13, wherein the control unit is configured to choose the flow value measuring unit corresponding to a smallest measurement flow value, as the monitoring measuring unit, from among the plural flow value measuring units.

16. The flow meter device according to claim 13, wherein the control unit is configured to choose the flow value measuring unit corresponding to a largest measurement flow value, as the monitoring measuring unit, from among the plural flow value measuring units.

17. The flow meter device according to claim 13, wherein the control unit is configured to cause the flow value measuring units which are other than one monitoring measuring unit to resume the measuring operations, when the flow value measured by the monitoring measuring unit is equal to or larger than a second predetermined value, in a state in which only the one monitoring measuring unit is performing the measuring operation of the flow value of the fluid.

* * * * *